(12) United States Patent
Gadkaree et al.

(10) Patent No.: US 8,593,787 B2
(45) Date of Patent: Nov. 26, 2013

(54) ELECTROCHEMICAL CAPACITOR HAVING LITHIUM CONTAINING ELECTROLYTE

(75) Inventors: Kishor Purushottam Gadkaree, Painted Post, NY (US); Shrisudersan Jayaraman, Painted Post, NY (US); James Robert Lim, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 135 days.

(21) Appl. No.: 12/764,311

(22) Filed: Apr. 21, 2010

(65) Prior Publication Data

US 2011/0261501 A1 Oct. 27, 2011

(51) Int. Cl.
*H01G 9/00* (2006.01)

(52) U.S. Cl.
USPC .......................................................... 361/502

(58) Field of Classification Search
USPC .......................................................... 361/502
See application file for complete search history.

(56) References Cited

U.S. PATENT DOCUMENTS

| | | | |
|---|---|---|---|
| 5,905,629 A | 5/1999 | Alford | |
| 5,953,204 A | 9/1999 | Suhara et al. | |
| 6,094,338 A * | 7/2000 | Hirahara et al. | 361/502 |
| 6,201,685 B1 | 3/2001 | Jerabek et al. | 361/502 |
| 6,212,062 B1 | 4/2001 | Day et al. | 361/502 |
| 6,225,733 B1 | 5/2001 | Gadkaree et al. | 313/352 |
| 6,304,426 B1 | 10/2001 | Wei et al. | 361/502 |
| 6,487,066 B1 | 11/2002 | Niiori et al. | 361/502 |
| 6,565,701 B1 | 5/2003 | Jerabek et al. | 156/305 |
| 6,714,391 B2 | 3/2004 | Wilk et al. | 361/15 |
| 6,738,252 B2 | 5/2004 | Okamura et al. | 361/502 |
| 7,385,801 B2 | 6/2008 | Ando et al. | 361/502 |
| 7,443,651 B2 | 10/2008 | Ando et al. | 361/503 |
| 7,697,264 B2 * | 4/2010 | Tasaki et al. | 361/502 |
| 7,835,136 B2 * | 11/2010 | Feaver et al. | 361/502 |
| 2004/0085710 A1 | 5/2004 | Takeuchi et al. | 361/502 |
| 2006/0057433 A1 | 3/2006 | Ando et al. | 429/9 |
| 2007/0002524 A1 | 1/2007 | Ando et al. | 361/503 |
| 2008/0055819 A1 | 3/2008 | Taguchi et al. | 361/504 |
| 2008/0094778 A1 | 4/2008 | Tanizaki et al. | 361/504 |
| 2008/0165471 A1 | 7/2008 | Kojima et al. | 361/503 |
| 2008/0220329 A1 | 9/2008 | Kojima et al. | 429/188 |
| 2009/0023066 A1 | 1/2009 | Kojima et al. | 429/221 |
| 2009/0027831 A1 | 1/2009 | Tasaki et al. | 361/523 |
| 2009/0029257 A1 | 1/2009 | Ando et al. | 429/231.95 |
| 2009/0109600 A1 | 4/2009 | Reddy et al. | 361/502 |
| 2009/0109601 A1 * | 4/2009 | Kume et al. | 361/502 |

FOREIGN PATENT DOCUMENTS

| | | |
|---|---|---|
| EP | 1 049 116 A1 | 11/2000 |
| EP | 2 012 331 A1 | 1/2009 |
| JP | 2007-266248 A | 10/2007 |
| WO | 02-095849 A2 | 11/2002 |
| WO | 2008-061212 A2 | 5/2008 |

* cited by examiner

*Primary Examiner* — Jayprakash N Gandhi
*Assistant Examiner* — Dion Ferguson
(74) *Attorney, Agent, or Firm* — Michael W. Russell (57) ABSTRACT

A device having a first electrode, a second electrode, a separator positioned between the first electrode and the second electrode, and an electrolyte incorporated throughout the first electrode, the second electrode, and the separator. The electrolyte includes one or more lithium salts and one or more solvents. The first electrode and second electrodes comprise a majority of activated carbon having a microporous pore size distribution.

20 Claims, 5 Drawing Sheets

ELECTROCHEMICAL CAPACITOR HAVING LITHIUM CONTAINING ELECTROLYTE

BACKGROUND

Although there has been extensive research involved with advancing ultracapacitor technology, there remains a need for devices having higher energy densities that can still be efficiently and cost-effectively manufactured without undue environmental or safety concerns.

SUMMARY

Disclosed herein is a device having a first electrode in an opposed relationship to a second electrode, a separator positioned between the first electrode and the second electrode, and an electrolyte incorporated throughout the first electrode, the second electrode and the separator. The electrolyte comprises one or more lithium salts and one or more solvents. The first and second electrodes comprise a majority of activated carbon, which has a microporous pore size distribution characterized by pores having a size of at most 1 nm that provide a combined pore volume of at least 0.3 cm$^3$/g, pores having a size of from 1 nm to 2 nm that provide a combined pore volume of at least 0.05 cm$^3$/g; and a combined pore volume of less than 0.15 cm$^3$/g for any pores having a size greater than 2 nm.

In a further embodiment, an electrochemical capacitor comprises a first electrode formed on a first current collector, a second electrode formed on a second current collector, and a separator positioned between the first electrode and the second electrode such that the separator is adjacent to the first and second electrodes. An electrolyte comprising one or more lithium salts and one or more solvents is incorporated throughout the first electrode, the second electrode, and the separator. The first and second electrodes comprise a majority of activated carbon, where the activated carbon has a microporous pore size distribution where pores having a size of $\leq 1$ nm provide a combined pore volume of $\geq 0.3$ cm$^3$/g, pores having a size of from $>1$ nm to $\leq 2$ nm provide a combined pore volume of $\geq 0.05$ cm$^3$/g; and any pores having a size of $>2$ nm provide a combined pore volume of $<0.15$ cm$^3$/g.

A still further embodiment relates to an electrochemical capacitor (ECC) stack that includes a plurality of ECC cells.

BRIEF DESCRIPTION OF THE DRAWINGS

The disclosure may be more completely understood in consideration of the following detailed description of various embodiments in connection with the accompanying drawings, in which.

DETAILED DESCRIPTION

Embodiments other than those specifically disclosed herein are contemplated and may be made without departing from the scope or spirit of the present disclosure. The following detailed description is not limiting. The definitions provided are to facilitate understanding of certain terms frequently used and do not limit the disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes, for example, 1, 1.5, 2, 2.75, 3, 3.80, 4 and 5) and any range within the recited range. Unless otherwise noted, percentages disclosed herein are expressed on a percentage by weight basis. In a similar vein, compositions or structures that are expressed as having a majority of a particular constituent comprise a majority by weight of the recited constituent.

As used in this specification and the appended claims, the singular articles "a" "an" and "the" encompass embodiments having plural referents unless the content clearly dictates otherwise. Use of a singular form of a term can encompass embodiments including more than one of such term, unless the content clearly dictates otherwise. For example, the phrase "adding a solvent" encompasses adding one solvent or more than one solvent. As used in this specification and the appended claims, the term "or" is generally employed in its sense including "either or both" unless the context clearly dictates otherwise. The terms "include" and "including" mean encompassing but not limited to, i.e., inclusive rather than exclusive.

The disclosure relates to electrical devices including, in some embodiments, electrochemical capacitors (ECCs), which can also be referred to as ultracapacitors. In embodiments, an ECC can include two electrodes separated by a porous separator and comprise an electrolyte solution. When an electric potential is applied to an ECC, ionic current flows due to the attraction of anions to the positive electrode and cations to the negative electrode. The ionic current flow generates an electric charge that is stored at the interface between each polarized electrode and the electrolyte solution.

The particular design of an ECC can vary depending on the intended application and can include, for example, jelly roll or cylindrical designs, oblong designs, prismatic designs, honeycomb designs, hybrid or pseudo-capacitive designs, supercapacitor or ultracapacitor type designs, and other designs known in the art. The disclosed ECCs can be utilized in any of these (as well as others) designs.

Figure 1A:
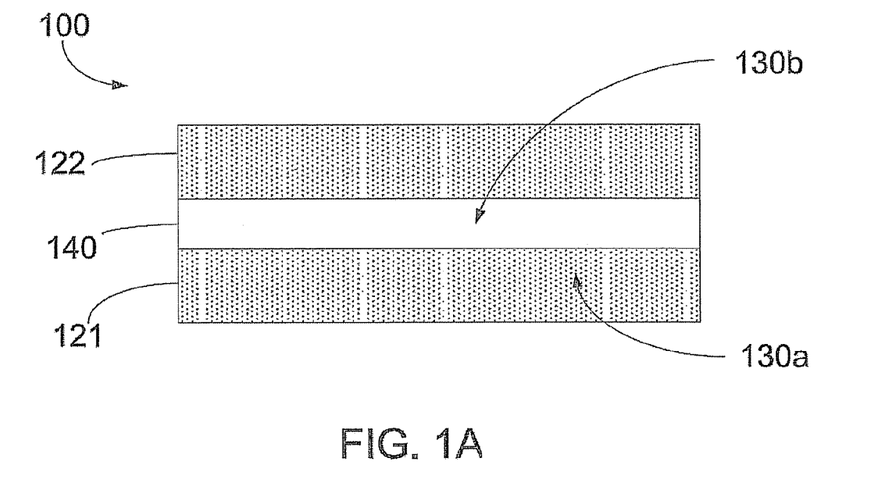
FIGS. 1A-1D are schematic views of electrochemical capacitors (ECCs) according to various embodiments.

FIG. 1A depicts an arrangement of elements in an exemplary device. The device 100 includes a first electrode 121 and a second electrode 122. Disposed between the first electrode 121 and the second electrode 122 is a separator 140. In embodiments, the separator 140 is directly adjacent both the first electrode 121 and the second electrode 122. One of the electrodes, for example the first electrode 121, can also be referred to as the anode, while the other electrode, in this case the second electrode 122, can be referred to as the cathode. An anode is defined as the electrode by which the current enters an electrochemical cell and a cathode is defined as the electrode by which the current exits an electrochemical cell.

The first electrode 121 and the second electrode 122 generally comprise porous carbon or activated carbon materials. The first electrode 121 and the second electrode 122 can be configured identically or to be different from one another. Thus, the description of various characteristics of electrodes can be applied to either or both electrodes. It should be understood that either the first electrode, the second electrode, or both the first and second electrodes can independently have any or all of the characteristics discussed herein.

A disclosed electrode includes activated carbon. An electrode that includes a majority (by weight) of activated carbon is referred to herein as an "activated carbon electrode." An activated carbon electrode may include materials other than activated carbon. In embodiments, either the first and second electrodes can comprise an activated carbon electrode. For example, one electrode can include a majority of activated carbon and the other electrode can include a majority of graphite. In embodiments, both the first electrode and the second electrode are activated carbon electrodes.

In embodiments, the activated carbon can have a relatively high carbon surface area. Utilizing activated carbon with a relatively high surface area can provide the device with a relatively high energy density. In embodiments, the activated carbon that is utilized in an electrode can have a carbon surface area of at least about 100 $m^2/g$ (e.g., at least about 1000 or 1500 $m^2/g$). Specific examples of activated carbon that may be utilized include coconut shell-based activated carbon, petroleum coke-based activated carbon, pitch-based activated carbon, polyvinylidene chloride-based activated carbon, polyacene-based activated carbon, phenolic resin-based activated carbon, polyacrylonitrile-based activated carbon, and activated carbon from natural sources such as coal, charcoal or other natural organic sources. In embodiments, an activated carbon electrode includes greater than about 50 wt. % activated carbon (e.g., greater than 50, 60, 70, 80, 90 or 95 wt. % activated carbon).

According to embodiments, an electrode for an ECC comprises activated carbon material having a total porosity greater than 0.4 $cm^3/g$ (e.g., greater than 0.4, 0.45, 0.5, 0.55, 0.6, 0.65 or 0.7 $cm^3/g$). The portion of the total pore volume resulting from micropores (d≤2 nm) can be 95% or greater (e.g., at least 95, 96, 97, 98 or 99%) and the portion of the total pore volume resulting from ultramicropores (d≤1 nm) can be 60% or greater (e.g., at least 60, 65, 70, 75, 80, 85, 90 or 95%). The pore size distribution of the activated carbon can include ultramicropores, micropores, mesopores and macropores and may be characterized as having a unimodal, bimodal or multi-modal pore size distribution. The ultramicropores can comprise 0.3 $cm^3/g$ or more (e.g., 0.4 $cm^3/g$ or more) of the total pore volume. Pores having a pore size (d) in the range of 1<d≤2 nm can comprise 0.05 $cm^3/g$ or more (e.g., at least 0.1, 0.15, 0.2 or 0.25 $cm^3/g$) of the total pore volume. If present, any pores having a pore size greater than 2 nm, which may include mesopores and/or macropores, can comprise 0.15 $cm^3/g$ or less (e.g., less than 0.1 or 0.04 $cm^3/g$) of the total pore volume.

Electrodes can include one or more binders. Binders can function to provide mechanical stability to an electrode by promoting cohesion in loosely assembled particulate materials. Binders can include polymers, co-polymers, or similar high molecular weight substances capable of binding the activated carbon (and other optional components) together to form porous structures. Specific exemplary binders include polytetrafluoroethylene (PTFE), polyvinylidene fluoride, or other fluoropolymer particles; thermoplastic resins such as polypropylene, polyethylene, or others; rubber-based binders such as styrene-butadiene rubber (SBR); and combinations thereof. In embodiments, PTFE can be utilized as a binder. In further embodiments, fibrillated PTFE can be utilized as a binder. By way of example, an electrode can include up to about 20 wt. % of binder (e.g., up to about 5, 10, 15 or 20 wt. %).

An electrode can also include one or more conductivity promoters. A conductivity promoter functions to increase the overall conductivity of the electrode. Exemplary conductivity promoters include carbon black, natural graphite, artificial graphite, graphitic carbon, carbon nanotubes or nanowires, metal fibers or nanowires, graphenes, and combinations thereof. In embodiments, carbon black can be used as a conductivity promoter. In embodiments, an electrode can include up to about 10 wt. % of a conductivity promoter. For example, an electrode can include from about 1 wt. % to about 10 wt. % of conductivity promoter (e.g., 1, 2, 4, or 10 wt. %).

Example activated carbon electrodes include activated carbon, a conductivity promoter and a binder. In embodiments, an electrode can include from about 80 wt. % to 95 wt. % of activated carbon, from about 1 wt. % to 10 wt. % of a conductivity promoter and from about 5 wt. % to 15 wt. % of a binder. One example electrode comprises 85 wt. % activated carbon, 5 wt. % conductivity promoter, and 10 wt. % binder. In one further example, an electrode comprises 85 wt. % activated carbon, 5 wt. % carbon black, and 10 wt. % fibrillated PTFE. In a device comprising a pair of electrodes, one or both of the first electrode and the second electrode can include these disclosed compositions.

Electrodes can be formed using a variety of methods and techniques. An exemplary method of forming an electrode utilizes a composition containing the components of the electrode (for example, activated carbon, a conductivity promoter and a binder) in a solvent to form a slurry or paste. The slurry or paste can be formed into a structure by applying pressure. Once formed into the desired structure, the electrode can be dried in order to remove residual solvent, water, or other volatile components. The drying temperature can depend at least in part on the identity of the solvent and the materials making up the electrode including, for example, the choice of binder. In embodiments, electrodes can be dried at a temperature of at least about 100° C. In embodiments, electrodes can be dried at a temperature of at least about 150° C. for 8 to 12 hours. It should also be noted that the electrodes can also be dried at other stages of preparation.

In embodiments, an electrode can be formed from a paste containing the components (e.g., activated carbon, conductivity promoter and binder). Shear pressure and compaction force via calendaring or rolling can be utilized to form sheets of the paste. Exemplary sheets can be about 5 mils thick. Such sheets can be cut to the desired size. In an example where a button cell is being formed, the sheet can be cut into a circle having a diameter of about 0.25 inches to about 1 inch, for example ⅝ inch. The electrode so formed can then be combined with the other components of the device.

One or both of the electrodes can optionally include deposited lithium on at least a portion of one or more surfaces thereof. In embodiments, one or both of the activated carbon electrodes in a device can have lithium deposited thereon. It should be noted that even once the lithium has been deposited, the electrode still contains a majority (by weight) of activated carbon, and can therefore be referred to as a lithium-deposited activated carbon electrode.

In embodiments, the deposited lithium does not form a continuous layer on the electrode, but instead is a discontinuous layer on the activated carbon electrode. The deposited lithium can function to provide a source of lithium cations to replenish the electrolyte. This can be advantageous because it may extend the lifetime of the ECC. As the amount of lithium increases, this beneficial effect of the lithium is also increased. However, too much lithium may introduce unwanted safety and cost issues.

In embodiments, the optional deposited lithium can be from about 0.0001 to about 6 wt. % of a total weight of the electrode. In embodiments, the lithium can be from about 0.0001 to about 3 wt. % of the total electrode weight. In further embodiments, the lithium can be from about 0.0001 to about 2 wt. % of the total electrode weight. The deposited lithium can be formed using known methods, including, for example, deposition via chemical vapor deposition (CVD), sputtering, electrochemical deposition, thermal evaporation, e-beam deposition, high power plasma deposition. In embodiments, vapor deposition such as CVD can be utilized because of the ease associated with vapor depositing a material over a relatively large area.

In a further example, lithium can optionally be deposited on one or more of the electrodes via electrochemical deposition. The electrochemical deposition can be carried out using a solution containing lithium cations as the electrolyte, a lithium foil as the anode, and the electrode to be coated as the cathode. The electrode to be coated can be attached, for example via lamination, to both sides of an aluminum (Al) current collector that has been pre-coated with a 0.5 to 3 μm layer of carbon ink. The Al current collector can be used as an electrical contact during the electro deposition of lithium.

After depositing the lithium, the double-sided structure can be punched into electrodes (for example a ⅝ inch cylinder or a disc). Such an electrode can be formed into a device by combining it with a second electrode (without or without deposited lithium) in a button cell format, for example. The surface of a first electrode with deposited lithium thereon may be configured to face the lithium-deposited surface of a second such electrode. In such an embodiment, the carbon electrode and the aluminum foil participate in electron transfer to the lithium-deposited surface of the carbon electrodes.

A lithium-deposited activated carbon electrode as disclosed above is not a lithium electrode, as that phrase is commonly utilized. Devices disclosed herein do not include a lithium electrode, which is defined as a free-standing, continuous layer of lithium metal. A lithium electrode generally includes a majority of lithium metal, and does not include activated carbon. In contrast, a lithium-deposited activated carbon electrode comprises a majority of activated carbon and has a high surface area. A conventional lithium electrode can have a surface area of not greater than about 20 m²/g, while a lithium-deposited activated carbon electrode can have a surface area of at least about 100 m²/g.

Disclosed devices also include a separator 140. The separator 140 can be positioned between the first electrode 121 and the second electrode 122 as seen in FIG. 1A. The separator 140 is generally a porous, electrically insulating material that is not reactive with the electrolyte. The separator is generally relatively thin in order to minimize the internal resistance of the device. Exemplary separator materials include cloth, nonwoven material, or porous bodies made of glass fibers, polyethylene, polypropylene, and cellulose. In embodiments, cellulose paper may be utilized.

Disclosed devices also include an electrolyte. The electrolyte is a liquid composition that is incorporated throughout the porous structure of the first electrode 121, the second electrode 122, and the separator 140. The first electrode 121, the second electrode 122, and the separator 140 can be infiltrated with electrolyte 130a, 130b by soaking the electrodes and the separator in the electrolyte prior to or during assembly of a device.

The electrolyte may comprise one or more lithium salts and one or more solvents. The lithium salt is generally a compound that includes a lithium cation ($Li^+$) that can disassociate in a suitable solvent. The lithium salt can include an anion that is relatively stable against oxidative decomposition at the cathode.

Exemplary lithium salts include, for example, lithium hexafluorophosphate ($LiPF_6$), lithium tetrafluoroborate ($LiBF_4$), lithium hexafluoroarsenate ($LiAsF_6$), lithium perchlorate ($LiClO_4$), lithium triflate ($LiCF_3SO_3$), lithium bis (trifluoromethanesulfone) imide ($LiN(SO_2CF_3)_2$), lithium bis(perfluoroethylsulfonyl) imide ($LiN(SO_2CF_2CF_3)_2$), and combinations thereof.

In embodiments, the electrolyte includes lithium hexafluorophosphate ($LiPF_6$). The lithium salt can include lithium imides including lithium bis(methyl)sulfonimide, lithium bis(sec-butyl)sulfonimide, lithium (methanesulfonyl)cyanamide, lithium tris(methanesulfonyl)methide, lithium bis(methanesulfonyl)(ethanesulfonyl)methide, lithium bis(ethanesulfonyl)(methanesulfonyl)methide, and combinations thereof.

The electrolyte also includes one or more solvents. Generally, suitable solvents can dissolve the lithium salt and do not detrimentally affect the electrodes, the separator, or other materials or structures with a device. In embodiments, solvents that can be used can be organic solvents, including nonaqueous organic solvents and aprotic organic solvents. Exemplary solvents include acetonitrile, 1,3-dioxolane, ethylene carbonate, propylene carbonate, butylene carbonate, dimethyl carbonate, diethyl carbonate, ethylmethyl carbonate, dimethoxyethane, propylmethyl carbonate, and combinations thereof. In embodiments, acetonitrile, propylene carbonate, ethylene carbonate, dimethyl carbonate, and mixtures thereof can be utilized as the solvent.

The electrolyte can have any suitable concentration of one or more lithium salts. In embodiments, the lithium salt has a concentration of at least about 0.5 M in the electrolyte, e.g., at least about 0.5, 1 or 2 M, such as from about 0.5 to 2 M.

Figure 1B:
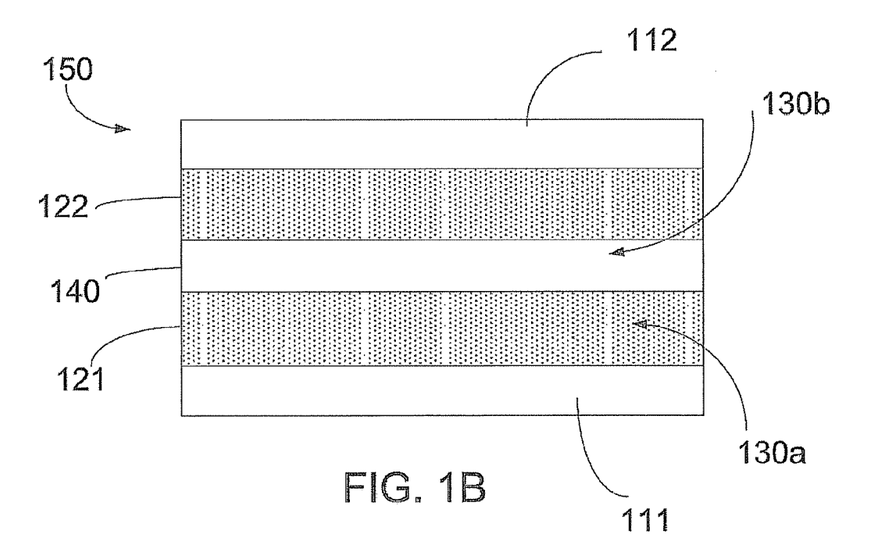

Disclosed devices can also include one or more current collectors. In embodiments, a device can include a first and a second current collector. The exemplary device 150 depicted in FIG. 1B includes a first current collector 111 and a second current collector 112. The first current collector 111 is generally adjacent to, or in contact with the first electrode 121, while the second current collector 112 is generally adjacent to, or in contact with the second electrode 122. First electrode 121, separator 140, second electrode 122, and an electrolyte (designated by arrows 130a and 130b) are positioned between the first current collector 111 and the second current collector 112.

The description of various characteristics of current collectors are meant to apply to either current collector. It should be understood that either the first current collector, the second current collector, or both can independently have any or all of the characteristics discussed herein.

A current collector can generally be made of any conductive material. In embodiments, the current collectors can be made of a metallic material. Specific exemplary materials include, for example, platinum, aluminum, copper, nickel, stainless steel, and other alloys. In embodiments, a thickness of the current collectors can range from about 5 μm to about 100 μm (e.g., from about 15 μm to 35 μm, for example about 25 μm).

The current collectors and the electrodes can be configured to be separable or configured to form a substantially inseparable structure. In embodiments, the electrodes can be formed on or adhered to the current collectors. For example, electrodes can be formed from a composition such as a slurry, and placed in contact with respective current collectors.

Electrodes can be adhered to respective current collectors by using a conductive adhesion layer. The conductive adhesion layer associated with the first electrode can be referred to as the first adhesion layer, and the conductive adhesion layer associated with the second electrode can be referred to as the second adhesion layer. In embodiments, sealing members can also be utilized. An example sealing member can be a ring that has an inner diameter that is at least as large as the diameter of the first and second electrodes. Sealing members can comprise thermoplastic rings that can be used to seal a device such as a button cell in order to add mechanical integrity to the device and contain the electrolyte within the cell. The electrodes and the separator, once soaked in the electrolyte, can have one or more sealing members applied thereto. For instance, the current collectors can be disposed on the respective electrodes and the entire structure can be heated to set the sealant.

Figure 1C:
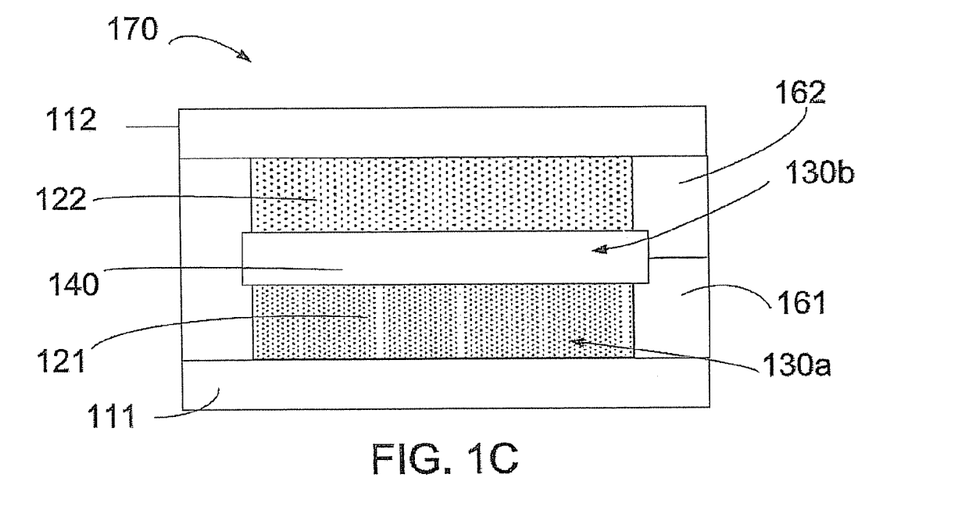

FIG. 1C shows a device 170 that includes a first sealing member 161, which is disposed adjacent to the first electrode 121 and the first current collector 111. The first sealing member 161 has an inner diameter that is at least as large as the outer diameter of the first electrode 121. The outer diameter of the sealing member can be larger than the diameter of the separator 140, and can generally match the total outer diameter of the current collectors 111, 112. The first electrode 121 is disposed inside the first sealing member 161, so that the first current collector 111 maintains contact with the first electrode 121. The first sealing member 161 can also be said to be disposed adjacent to the first current collector 111 and around the periphery of the first electrode 121.

The second sealing member 162 has an inner diameter that is at least as large as the outer diameter of the second electrode 122. The second electrode 122 is disposed inside the second sealing member 162, so that the second current collector 112 maintains contact with the second electrode 122. The second sealing member 162 can also be said to be disposed adjacent to the second current collector 112 and around the periphery of the second electrode 122. The sealing members generally function by making contact with each other to form a seal. The first sealing member 161 and the second sealing member 162 function to maintain the electrolyte 130a, 130b within the device.

Figure 1D:
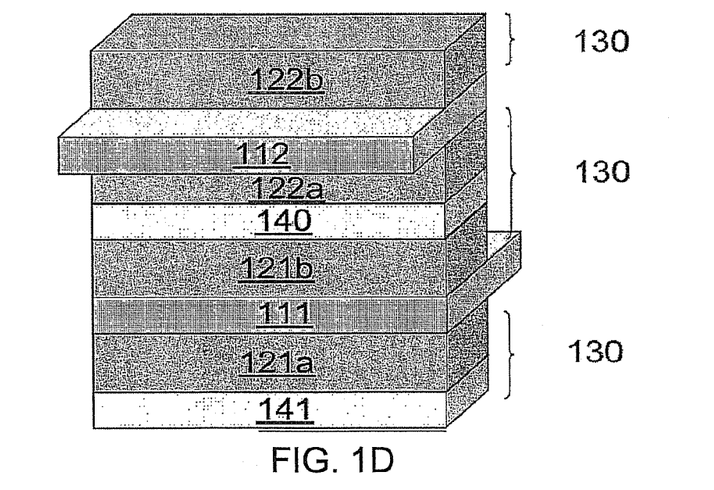

In embodiments, an exemplary ECC that is formed into a jelly roll design (as well as ECCs used in other designs) can include a current collector that has activated carbon electrodes on both surfaces. Such an ECC for use in a jelly roll design can be seen in FIG. 1D. This exemplary ECC includes a first current collector 111 with adjacently disposed first carbon-based electrodes 121a and 121b, a second current collector 112 with adjacently disposed second carbon-based electrodes 122a and 122b, a first separator 140 and a second separator 141. Electrolyte 130 is indicated as being incorporated into the first electrodes 121a and 121b, the second electrodes 122a and 122b, and the first and second separators 140 and 141.

Beyond jelly roll designs and a button cell configuration (which is generally considered a small cell format), other known designs can also be constructed and used. For example, other large cell formats such as D cell and larger devices can also be utilized in conjunction with the materials and processes disclosed herein.

The disclosed ECCs can have energy densities that are higher than those seen with previously fabricated ECCs. For example, the disclosed ECCs can have energy densities that are higher than similar ECCs that include commonly-utilized electrolytes such as tetraethyl ammonium-tetra fluoroborate (TEA-TFB). In embodiments, the disclosed ECCs can have energy densities that are at least about two times higher than ECCs that utilize TEA-TFB electrolytes. Disclosed ECCs having button cell structures can have energy densities of at least about 15 Watt hours/liter (Wh/l). Further, ECCs having button cell structures can have energy densities of at least about 17 Wh/l. In embodiments, disclosed ECCs having button cell structures can have energy densities of at least about 20 Wh/l. In embodiments, ECCs having large formats, such as for example jelly roll designs and/or D cell and larger, can have energy densities of at least about 6 Wh/l.

The disclosed ECCs are also compatible with higher voltages than previously utilized ECCs. For example, previously utilized ECCs that includes a TEA-TFB electrolyte can have maximum voltages of about 2.7 V. The disclosed ECCs can have maximum voltages up to about 4.5 V.

The disclosed ECCs are able to provide the advantageous properties discussed above without the need for a complicated fabrication process. For instance, the disclosed ECCs are able to provide the advantageous properties without the use of an additional electrode (e.g., a lithium metal electrode in addition to two carbon-based electrodes). The requirement for such additional device components made the fabrication more difficult and therefore expensive, reducing the energy density, and involve significant lithium metal, which can lead to safety and environmental concerns.

For higher power applications, a plurality of individual ECCs can be utilized. ECC devices can be formed into ECC multi-cell stacks, packs, or series of cells. An ECC pack refers to a device that includes a plurality of ECC devices or structures. When ECCs are utilized in high power demand applications, such as hybrid electric vehicles (HEVs), multiple ECCs can be connected in series to boost the output voltage. The specific size and geometry of an array of ECCs can vary depending on the intended application of the ECC pack. Exemplary configurations for an ECC stack are known to those of skill in the art and any such configurations can be utilized with the ECC devices disclosed herein. In embodiments, such a pack can be a two dimensional array of ECCs comprising 2, 3, 4, 5, 10, 20, or more, or a plurality of ECCs arranged in a single or multiple rows. In embodiments, the ECC pack can be a three dimensional array of ECCs that includes multiple two-dimensional arrays of the same or varying geometry positioned in an arrangement, such as a vertical arrangement. In embodiments, a particular configuration that is utilized can be chosen to maximize the energy per unit volume of the ECC pack. An exemplary configuration for a multi-cell pack can be found in US Patent Application Publication No. 2009/0109600, the disclosure of which is incorporated by reference herein.

ECC devices and cells as disclosed herein can be utilized for numerous different applications. Because of the high energy densities and relatively high power output of the disclosed ECC devices, they may be extremely useful in applications where pulsed power is needed. Exemplary applications range from, for example, small size devices such as cell phones to large size devices such as hybrid vehicles.

Additional features of the disclosure are described below with reference to various examples.

EXAMPLE 1

Figure 2:
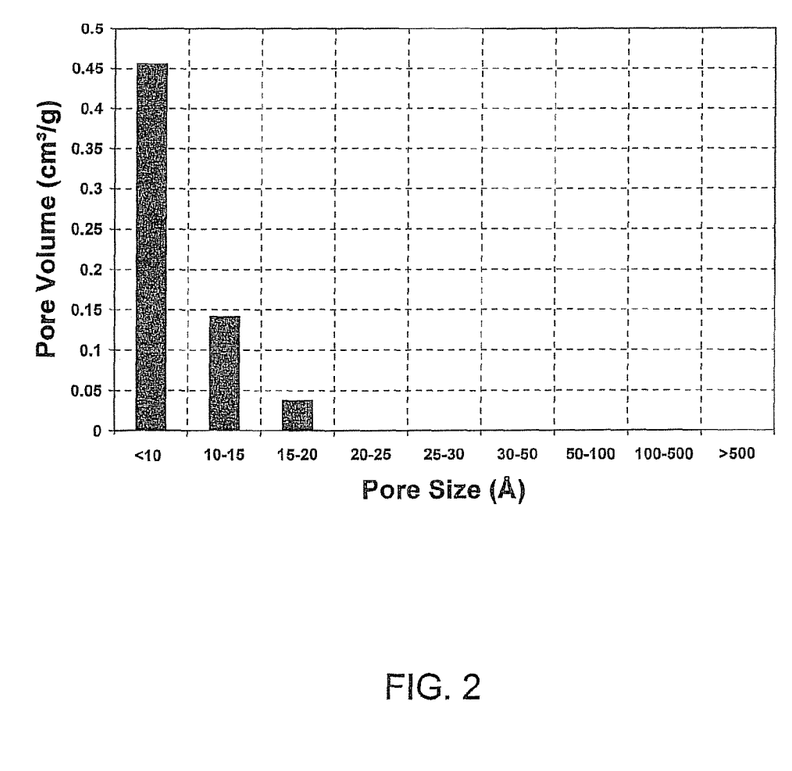
FIGS. 2 and 3 are plots of pore size distribution for various activated carbon materials.

A ECC button cell was fabricated using a mixture comprising 85 wt % activated carbon, 5 wt % carbon black, and 10 wt % PTFE (Dupont™ Teflon® PTFE 613A, Dupont, Wilmington, Del.). One part of this mixture was added to 2.6 parts of isopropyl alcohol to form a slurry. The slurry was thoroughly mixed and then allowed to semi-dry in an oven. The semi-dried material was then formed and densified into a 5 mil thick sheet that was punched into ⅝ inch diameter disc electrodes. The electrodes were dried in a vacuum oven at about 150° C. overnight. The surface area of the activated carbon within the electrodes was measured by BET gas adsorption analysis. The activated carbon within the electrodes had a surface area of about 1700 m²/g. A plot of pore size distribution versus pore size for the activated carbon material is illustrated in FIG. 2.

The electrodes and a cellulose paper separator (NKK TF44, Nippon Kodoshi Corporation, Kochi-ken Japan) were soaked for several seconds in a 1M solution of lithium hexafluorophosphate (LiPF$_6$) in acetonitrile. The cellulose paper was positioned between the two electrodes, an extra drop of the LiPF$_6$ solution was added to the top carbon electrodes, and sealing rings (3M Bonding Film 615S, 3M Company, Inc., St. Paul, Minn.) were applied to both surfaces of 1 mil thick platinum foil current collectors. The button cell was then sealed by locally heating the outer edge the device (directly shadowing the sealing rings) at about 200° C. to 250° C. in order to activate the polymeric sealant.

The ECC button cell was tested using cyclic voltammetry (CV), electrochemical impedance spectroscopy (EIS), and galvanostatic charge/discharge. The CV was performed at a scan rate of 20 mV/second with various potential windows over a range of 0 to 4.5 V. The EIS included measuring impedance while applying an AC perturbation having an amplitude of 10 mV over a constant DC voltage of 0 V in the frequency range of 0.01 to 10,000 Hz. The galvanostatic charge discharge was performed at a current magnitude of 10 mA.

The energy density of the button cell was calculated using the integrated energy method, which consists of numerically integrating the galvanostatic data (potential versus time data) and multiplying it by the discharge current to obtain the actual energy delivered by the device between two potentials V$_1$ and V$_2$.

$$\text{Energy} = I_{disch} \times \int_{V_1}^{V_2} V \, dt$$

Energy density can then be calculated by dividing the actual energy delivered by the device volume.

$$EnergyDensity(\text{Wh/l}) = \frac{\text{Energy(W sec)}}{DeviceVolume(\text{ml})} \times \frac{1000(\text{ml/l})}{3600(\text{sec/hr})}$$

The device capacitance (C$_{device}$ in Farads) can be calculated from the energy as follows:

$$C_{device} = \frac{2 \times I_{disch} \times \int_{V_1}^{V_2} V \, dt}{(V_1^2 - V_2^2)}$$

The energy density of the comparative button cell fabricated as above was measured to be 17.6 Wh/l.

COMPARATIVE EXAMPLE 1A

A button cell was fabricated as in Example 1 with the exception that the electrolyte was a 1 M solution of tetraethyl ammonium-tetrafluoroborate (TEA-TFB) in acetonitrile. The energy density of the button cell was 11.5 Wh/l.

COMPARATIVE EXAMPLE 1B

Figure 3:
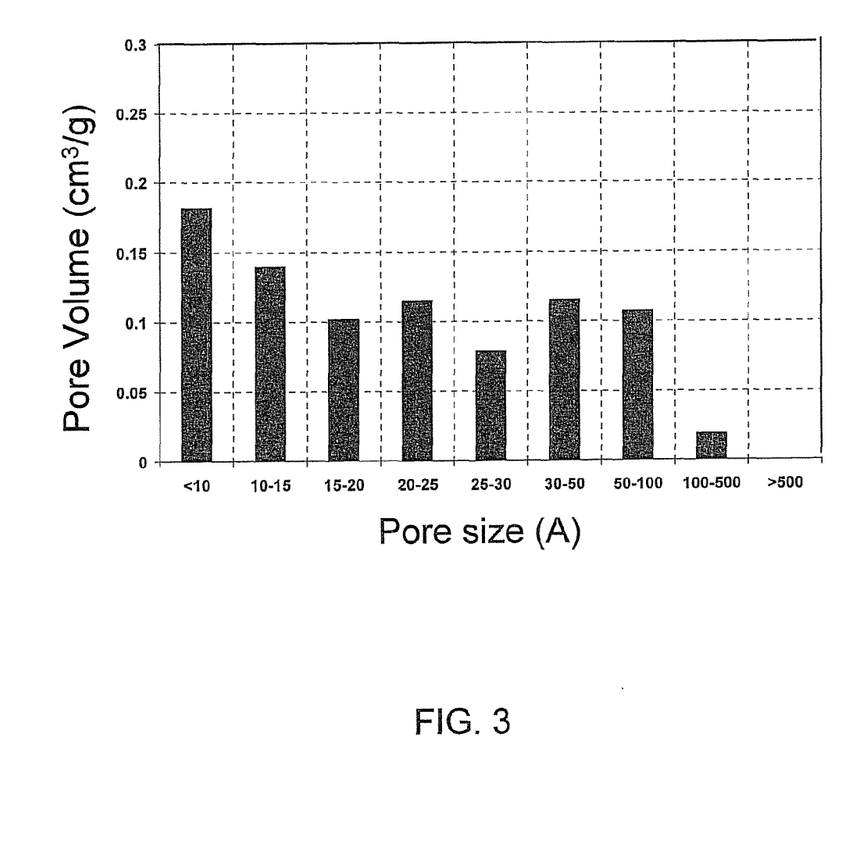

A further button cell was fabricated according to Example 1 using a 1 M solution of LiPF$_6$ in acetonitrile as the electrolyte, but using activated carbon having the pore size distribution shown in FIG. 3. The energy density of this comparative device was 9 Wh/l.

EXAMPLE 2

A button cell was fabricated as in Example 1 with the exception that one of the electrodes was deposited with a layer of lithium. After formation of the densified carbon sheet (5 mil), two such sheets were double-side laminated onto a pre-coated Al current collector. The pre-coating comprised 0.5 to 3 microns of conductive carbon. This structure was then placed into the assembly shown in FIG. 4.

Figure 4:
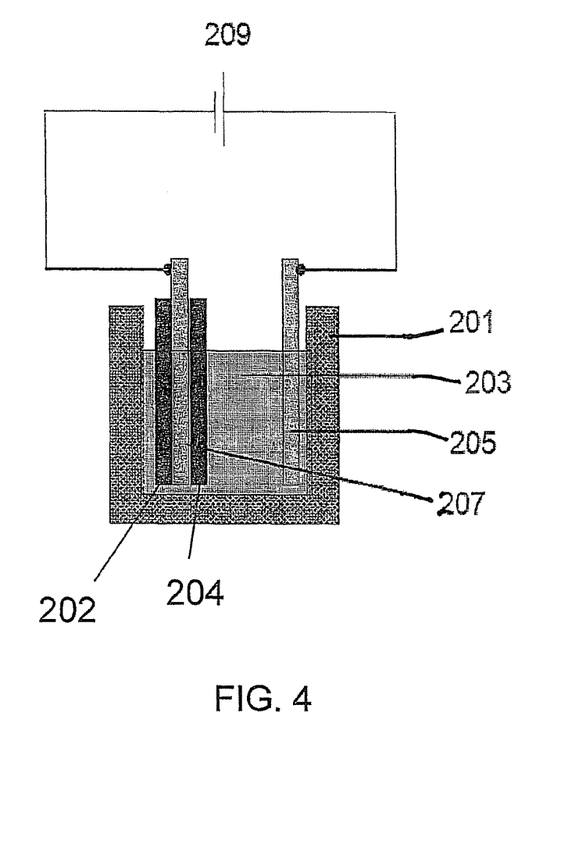
FIG. 4 is a schematic illustration of an apparatus for forming a lithium-deposited activated carbon electrode.

The electro-deposition setup in FIG. 4 shows the carbon electrodes 202, 204 formed on aluminum current collector 207. The current collector 207 acts as the cathode. The cathode is electrically connected through a potentiostat 209 to a lithium foil 205, which functions as the anode. A container, such as a Teflon cell 201 is filled with a 1 M solution of lithium hexafluorophosphate (LiPF$_6$) in acetonitrile 203. Application of a constant current of approximately 20 mA or greater causes electroreduction of lithium cations (Li$^+$) onto the carbon electrodes 202, 204. The lithium cations lost from the electrolyte are replenished through the stripping action occurring at the anode. The amount of lithium deposited on the carbon electrodes can be controlled by controlling the applied current and/or time. After deposition of lithium, the lithium-deposited activated carbon electrode was punched into ⅝ inch diameter discs.

The electrode discs were fabricated into a button cell as described in Example 1. The energy density of the button cell was measured according to the method of Example 1 and was found to be 15.5 Wh/l.

EXAMPLE 3

A button cell was fabricated as in Example 1 with the exception that the electrolyte was a 1.5 M solution of lithium hexafluorophosphate (LiPF$_6$) in ethylene carbonate:acetonitrile (25:75 by volume). The energy density of the button cell was 22 Wh/l. The maximum voltage of the ECC button cell was measured and found to be greater than 2.7 V.

COMPARATIVE EXAMPLE 3

The experiment of Example 3 was repeated but using carbon having a pore size distribution given in FIG. 3. The energy density obtained in this comparative button cell experiment was 9.7 Wh/l, which is less than 50% of the value obtained in Example 3, indicating that the microporous pore size distribution of the activated carbon of FIG. 2 can be used to obtain higher performance with the lithium salt containing electrolyte.

EXAMPLE 4

A button cell was fabricated as in Example 1 with the exception that the electrolyte was a 1.5 M solution of lithium hexafluorophosphate (LiPF$_6$) in ethylene carbonate:dimethyl carbonate (50:50 by volume). The energy density of the button cell was measured as discussed above and was found to be 17.7 Wh/l. The maximum voltage of the ECC button cell was measured and found to be greater than 2.7V.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A device comprising:
    a first electrode in an opposed relationship to a second electrode;
    a separator positioned between the first electrode and the second electrode; and
    an electrolyte incorporated throughout the first electrode, the second electrode and the separator, wherein
    the electrolyte comprises one or more lithium salts and one or more solvents, and
    the first and second electrodes comprise a majority of activated carbon, the activated carbon having a pore size distribution wherein:
    pores having a size of ≤1 nm provide a combined pore volume of ≥0.3 cm$^3$/g;
    pores having a size of from >1 nm to ≤2 nm provide a combined pore volume of ≥0.05 cm$^3$/g; and
    any pores having a size of >2 nm provide a combined pore volume of <0.15 cm$^3$/g, wherein the device has a maximum operable voltage of greater than 2.7 Volts.

2. The device of claim 1, wherein the lithium salt is selected from the group consisting of lithium hexafluorophosphate (LiPF$_6$), lithium tetrafluoroborate (LiBF$_4$), lithium hexafluoroarsenate (LiAsF$_6$), lithium perchlorate (LiClO$_4$), lithium triflate (LiCF$_3$SO$_3$), lithium bis(trifluoromethanesulfone) imide (LiN(SO$_2$CF$_3$)$_2$), lithium bis (perfluoroethylsulfonyl) imide (LiN(SO$_2$CF$_2$CF$_3$)$_2$), and combinations thereof.

3. The device of claim 1, wherein the lithium salt is lithium hexafluorophosphate.

4. The device of claim 1, wherein the solvent is selected from the group consisting of acetonitrile, 1,3-dioxolane, ethylene carbonate, propylene carbonate, butylene carbonate, dimethyl carbonate, diethyl carbonate, ethylmethyl carbonate, dimethoxyethane, propylmethyl carbonate, and combinations thereof.

5. The device of claim 1, wherein the solvent is selected from the group consisting of acetonitrile, ethylene carbonate, propylene carbonate, and combinations thereof.

6. The device of claim 1, wherein the lithium salt has a concentration in the electrolyte of between about 0.5 and 2 M.

7. The device of claim 1, wherein at least one of the first and second electrodes comprises a lithium-deposited activated carbon electrode.

8. The device of claim 7, wherein the deposited lithium comprises from about 0.0001 wt. % to about 6 wt. % of a total weight of the electrode.

9. The device of claim 1, wherein the device does not include a lithium electrode.

10. An electrochemical capacitor comprising:
    a first electrode formed on a first current collector, a second electrode formed on a second current collector, and a separator positioned between the first electrode and the second electrode such that the separator is adjacent to the first and second electrodes; and
    an electrolyte incorporated throughout the first electrode, the second electrode and the separator, wherein
    the electrolyte comprises one or more lithium salts and one or more solvents, and
    the first and second electrodes comprise a majority of activated carbon, the activated carbon having a pore size distribution wherein:
    pores having a size of ≤1 nm provide a combined pore volume of ≥0.3 cm$^3$/g;
    pores having a size of from >1 nm to ≤2 nm provide a combined pore volume of ≥0.05 cm$^3$/g; and
    any pores having a size of >2 nm provide a combined pore volume of <0.15 cm$^3$/g, wherein the capacitor has a maximum operable voltage of greater than 2.7 Volts.

11. The electrochemical capacitor of claim 10, wherein the lithium salt is selected from the group consisting of lithium hexafluorophosphate (LiPF$_6$), lithium tetrafluoroborate (LiBF$_4$), lithium hexafluoroarsenate (LiAsF$_6$), lithium perchlorate (LiClO$_4$), lithium triflate (LiCF$_3$SO$_3$), lithium bis (trifluoromethanesulfone) imide (LiN(SO$_2$CF$_3$)$_2$), lithium bis (perfluoroethylsulfonyl) imide (LiN(SO$_2$CF$_2$CF$_3$)$_2$), and combinations thereof.

12. The electrochemical capacitor of claim 10, wherein the solvent is selected from the group consisting of acetonitrile, 1,3-dioxolane, ethylene carbonate, propylene carbonate, butylene carbonate, dimethyl carbonate, diethyl carbonate, ethylmethyl carbonate, dimethoxyethane, propylmethyl carbonate, and combinations thereof.

13. The electrochemical capacitor of claim 10, wherein the lithium salt has a concentration in the electrolyte of between about 0.5 and 2 M.

14. The electrochemical capacitor of claim 10, wherein at least one of the first and second electrodes comprises a lithium-deposited activated carbon electrode.

15. The electrochemical capacitor of claim 14, wherein the deposited lithium comprises from about 0.0001 wt. % to about 6 wt. % of a total weight of the electrode.

16. The electrochemical capacitor of claim 10, further comprising a first sealing member disposed adjacent to the first current collector and around a periphery of the first electrode, and a second sealing member disposed adjacent to the second current collector and around a periphery of the second electrode.

17. The electrochemical capacitor of claim 10, wherein the capacitor has an energy density of at least about 15 Wh/l.

18. The electrochemical capacitor of claim 10, where the capacitor has a large cell format having an energy density of at least about 6 Wh/l.

19. An electrochemical capacitor (ECC) pack comprising a plurality of ECC cells, each ECC cell comprising an electrochemical capacitor according to claim 10 where none of the ECC cells include a lithium electrode.

20. An electrochemical capacitor (ECC) pack comprising a plurality of ECC cells, each ECC cell comprising an electrochemical capacitor according to claim 10 where wherein at least one of the first and second electrodes in each of the plurality of ECC cells is a lithium-deposited activated carbon electrode.

\* \* \* \* \*